(12) United States Patent
Gkoufas et al.

(10) Patent No.: US 11,555,707 B2
(45) Date of Patent: Jan. 17, 2023

(54) COLLABORATIVE POSITIONING NAVIGATION

(71) Applicant: International Business Machines Corporation, Armonk, NY (US)

(72) Inventors: Ioannis Gkoufas, Dublin (IE); Stefano Braghin, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 16/695,547

(22) Filed: Nov. 26, 2019

(65) Prior Publication Data

US 2021/0156699 A1 May 27, 2021

(51) Int. Cl.
*G01C 21/34* (2006.01)
*G06F 16/22* (2019.01)
*G06F 16/29* (2019.01)

(52) U.S. Cl.
CPC ............. *G01C 21/34* (2013.01); *G06F 16/22* (2019.01); *G06F 16/29* (2019.01)

(58) Field of Classification Search
CPC ........ G01C 21/00; G01C 21/26; G01C 21/34; G06F 16/00; G06F 16/20; G06F 16/22; G06F 16/29
USPC ....................................................... 701/410
See application file for complete search history.

(56) References Cited

U.S. PATENT DOCUMENTS

| | | |
|---|---|---|
| 9,301,100 B1 | 3/2016 | Jampani |
| 10,057,878 B2 | 8/2018 | Wirola |
| 2011/0250903 A1* | 10/2011 | Huang ................... G01S 5/0263 455/456.1 |
| 2013/0282279 A1* | 10/2013 | Chitre .................... G01C 21/00 701/522 |
| 2014/0155098 A1* | 6/2014 | Markham ............ H04B 1/0064 455/456.3 |
| 2015/0168153 A1* | 6/2015 | Hsu .......................... G01B 7/00 701/469 |

(Continued)

FOREIGN PATENT DOCUMENTS

| | | |
|---|---|---|
| EP | 1207404 B1 | 5/2010 |
| EP | 2845067 B1 | 10/2018 |
| WO | 2019133048 A1 | 7/2019 |

OTHER PUBLICATIONS

Gu et al., "A Survey of Indoor Positioning Systems for Wireless Personal Networks", IEEE Communications Surveys & Tutorials, vol. 11, No. 1, First Quarter 2009, Downloaded on Jul. 6, 2010 at 12:28:54 UTC from IEEE Xplore, 20 pages.

(Continued)

*Primary Examiner* — Krishnan Ramesh
(74) *Attorney, Agent, or Firm* — Brian M. Restauro (57) ABSTRACT

Embodiments of the present invention provide computer-implemented methods, computer program products, and systems. Embodiments of the present invention can be used to receive position information for one or more user devices and location information for an area. Embodiments of the present invention can predict one or more locations of the one or more user devices. Embodiments of the present invention can, in response to a request for navigation services, dynamically navigate a first user device of the one or more devices to a second user device of the one or more devices within the area.

20 Claims, 6 Drawing Sheets

(56) References Cited

U.S. PATENT DOCUMENTS

| | | | | |
|---|---|---|---|---|
| 2015/0241548 | A1* | 8/2015 | Jones | G01S 5/02 |
| | | | | 455/456.1 |
| 2016/0010997 | A1* | 1/2016 | Hinnegan | G06F 16/29 |
| | | | | 701/522 |
| 2016/0077189 | A1* | 3/2016 | Elias | H04W 4/33 |
| | | | | 455/456.6 |
| 2016/0245638 | A1* | 8/2016 | Sheinker | G01C 21/005 |
| 2017/0318418 | A1* | 11/2017 | Alizadeh-Shabdiz | |
| | | | | H04W 4/021 |
| 2018/0189713 | A1* | 7/2018 | Matthiesen | H04L 67/16 |
| 2018/0262961 | A1 | 9/2018 | Ökvist | |

OTHER PUBLICATIONS

Larsson, Erik G., "Cramér-Rao Bound Analysis of Distributed Positioning in Sensor Networks", IEEE Signal Processing Letters, vol. 11, No. 3, Mar. 2004, 4 pages.

Randell et al., "Low Cost Indoor Positioning System", Department of Computer Science, University of Bristol, UK., Printed Nov. 19, 2019, 7 pages.

Rife, Jason, "Collaborative Positioning for Formation Flight", This paper submitted to: AIAA J. of Guidance, Control, and Dynamics (submitted 2011), Last updated on Jul. 14, 2011, 33 pages.

Salameh et al., "Collaborative positioning and embedded multi-sensors fusion cooperation in advanced driver assistance system", Transportation Research Part C 29 (2013) 197-213, Accepted May 17, 2012, © 2012 Elsevier Ltd., 17 pages, <http://dx.doi.org/10.1016/j.trc.2012.05.004>.

Zhuang et al., "Autonomous smartphone-based WiFi positioning system by using access points localization and crowdsourcing", Pervasive and Mobile Computing 18 (2015) 118-136, Accepted Feb. 2, 2015, © 2015 Elsevier, 19 pages, <http://dx.doi.org/10.1016/j.pmcj.2015.02.001>.

Gkoufas et al., "Anatomy and Deployment of Robust Al-Centric Indoor Positioning System", Demonstration on Pervasive Computing and Communications 2019, pp. 340-342.

Gkoufas et al., "Copernicus: A Robust Al-Centric Indoor Positioning System", 2018 International Conference on Indoor Positioning and Indoor Navigation (IPIN), Sep. 24-27, 2018, Nantes, France, 8 pages.

* cited by examiner

COLLABORATIVE POSITIONING NAVIGATION

BACKGROUND

The present invention relates generally to the navigation services, and more particularly to navigation of moving entities.

In general, navigation systems can determine the position of a user from radio signals of satellites. Typically, navigation systems receive radio signals, calculate a user's position, and route a user to an intended destination. In some instances, navigation systems have features that allow a user to sort route preferences by shortest route and fastest route. In other instances, navigation systems have features to avoid certain locations (e.g., toll roads).

In certain instances, navigation systems can receive input other than a location's physical address. For example, a navigation system can receive input for a non-specific location or a description for a set of various locations rather than the location's physical address.

SUMMARY

Embodiments of the present invention provide computer-implemented methods, computer program products, and systems that receive position information for one or more user devices and location information for an area; predict one or more locations of the one or more user devices; and in response to a request for navigation services, dynamically navigate a first user device of the one or more devices to a second user device of the one or more devices within the area.

DETAILED DESCRIPTION

Embodiments of the present invention recognize that indoor positioning of current navigation services lack features to navigate from one user to another user within a confined area. In these instances, embodiments of the present invention recognize that part of the problem stems from finding a balance between accuracy and cost of infrastructure to make navigation services more accurate. As such, embodiments of the present invention provide cost effective solutions to navigate users to a location that is non-specific within a structure (e.g., within a building) and is identified and located through the use of one or more terms, icons, and signal strength using probabilistic matching and crowd-sourcing techniques as described in greater detail in the Specification. For example, embodiments of the present invention can navigate within a structure by establishing one or more beacon points between users and known signal sensors (e.g., beacons, sensors, environmental information, etc.), generating position mapping using the established beacon points, predicting real time position based on the established beacon points, and navigating one user to another user based on the predicted real time position and established beacon points.

As used herein a "point of interest" refers to a geographic area that is not accessible by and cannot be navigated to using traditional motor vehicles. In some instances, a point of interest may refer to an area within a building (e.g., a hallway, a room, a point of interest, etc.). In other instances, a "point of interest" can include another user or a device associated with another user. In yet other embodiments.

A point of interest may be a geographical indicator (e.g., positional information entered by a user). For example, a geographical indicator can be a junction point (such as Y, X, O-shaped junctions), places of interests (such as gas station, restaurant, hospital, etc.), directional information with respect to places of interests (such as right of gas station, left of restaurant, etc.), proximity to a current or known location (such as a search radius, search region, etc.), and navigational direction with respect to the proximity to a current location (such as north, south, east, west, etc.).

As used herein, "positional information" refers to directional information or changes in directional information that includes a user or a target's location. Positional information can also include information surrounding an area of either the user or target (e.g., location information). For example, positional information can include building architecture, building plans, locations of one or more device sensors (e.g., Wi-Fi, access points, Bluetooth® receivers, or other detection capable devices), hours of operation of a building, road closures, anticipated traffic based on scheduled events such as concerts, real-time traffic, queue status of locations such as restaurant wait times, user shopping preferences, changes in location where the location is a moving location, speed and cardinal direction of a location (e.g., where the location destination is a user, the speed of the location can be of the user).

Figure 1:
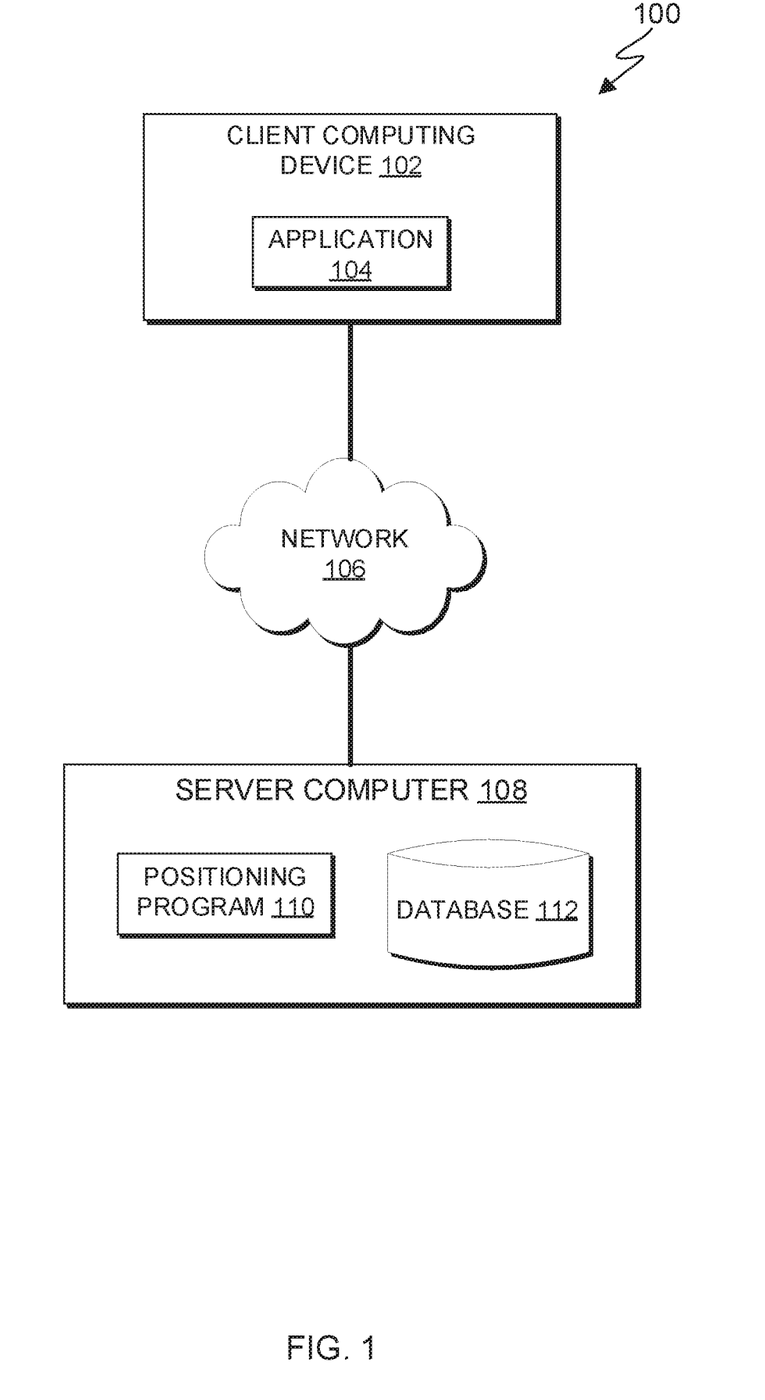
FIG. 1 is a functional block diagram illustrating a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 6.

Client computing device 102 is a digital device associated with a user and includes application 104. Application 104 communicates with server computer 108 to access positioning program 110 (e.g., using TCP/IP) to access points of interests and position information. Application 104 can further communicate with positioning program 110 to transmit instructions to accurately provide position information, navigate users within a structure to each other, establish beacon points, and crowd source position and navigation information based on the user's preferences as discussed in greater detail with regard to FIGS. 2-5. In some embodiments, application 104 can transmit requests to positioning program 110 to navigate a user within a structure according to user preferences. In other embodiments, application 104 can transmit user preferences and/or user search queries. In general, application 104 can be implemented using a browser and web portal or any program that can interface with or otherwise access positioning program 110.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts positioning program 110 and database 112. In this embodiment, database 112 functions as a repository for stored content. Database 112 can reside on a cloud infrastructure and stores user generated content. In some embodiments, database 112 can function as a repository for one or more files containing information associated with a user such as position information.

As used herein, "content" refers to one or more files that contain information or data. In this embodiment, content can refer to directional information or changes in directional information that includes a user or a target's location. Positional information can also include information surrounding an area of either the user or target (e.g., location information). For example, positional information can include building architecture, building plans, locations of one or more device sensors (e.g., Wi-Fi, access points, Bluetooth® receivers, or other detection capable devices), hours of operation of a building, road closures, anticipated traffic based on scheduled events such as concerts, real-time traffic, queue status of locations such as restaurant wait times, user shopping preferences, changes in location where the location is a moving location, speed and cardinal direction of a location (e.g., where the location destination is a user, the speed of the location can be of the user). Positioning information program 110 can generate content and associated position information and store the generated content to database 112.

In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108. In other embodiments, database 112 can be stored on other computing devices (not shown) or can be a combination of one or more other databases that has given permission access to positioning program 110.

In this embodiment, positioning program 110 resides on server computer 108. In other embodiments, positioning program 110 can be stored locally on client computing device 102. In yet other embodiments, an instance of positioning program 110 can be stored on client computing device 102 and can communicate with another instance of positioning program 110 residing on server computer 108. In some embodiments, positioning program 110 can be a stand alone program on a computing device. In yet other embodiments, positioning program 110 can be integrated as part of a Global Positioning Service (GPS) system and/or service.

Positioning program 110 dynamically navigates moving entities within a structure by, predicting locations of each respective moving entity. In this embodiment, positioning program 110 includes sensor collector (not shown), a detection module (not shown), a particle filter module (not shown for determining probabilistic positioning, and a merger module (not shown). In this embodiment, a sensor collector is defined as a component that estimate's a user's position based on a plurality of input signals such as magnetic field, Bluetooth® beacons, and Wi-Fi beacons). A detection module, as used herein refers to a component that detects proximity to other users of positioning program 110 and can publish a user's predicted position to approved users. Finally, a merger module incorporates the prediction position of a user with position information received by one or more external sources, beacons, and/or other users. In certain other embodiments, position program 110 can also include a position estimation module, a neighbor detection module, and a signaling system.

In this embodiment, positioning program 110 navigates moving entities within a structure by establishing beacon points and using the established beacon points to predict locations of moving entities. A "beacon point" or "location beacon" is a location that can be fixed or moving. This location can emit and/or receive a signal for a specified radius (e.g., a cell phone, Wi-Fi access point, Bluetooth®, Near Field Communication (NFC) devices, etc. A beacon point can be one or more user cell phones. In this embodiment, positioning program 110 establishes at least one beacon point.

For example, positioning program 110 can navigate between two users, a first user and a second user, utilizing the first user as a fixed beacon point (e.g., the first user is stationary while the second user is moving towards the first user). During the first time interval (e.g., t=0), both locations of users are estimated with a low confidence because positioning program 110 is leveraging only magnetic fields and neither user device has connected to an established beacon point.

Continuing the above example, positioning program 110 can detect and establish a beacon point for a first user (e.g., the first user's device) when the first user's device connects to a Bluetooth® beacon (e.g., beacon point A). Positioning program 110 can then predict and establish the first user's location with a high confidence level. Positioning program 110 can then detect the second user device based off of the first user device's proximity to the second user device. Accordingly, positioning program 110 can then predict the second user's location as having a high confidence level based off its position relative to the first user device.

In this embodiment, confidence thresholds are configured to have three levels of confidence: low, medium, and high. In this embodiment confidence threshold are based on numeric values, a scale from zero to one hundred percent, with lower numbers indicating low confidence and higher numbers indicating higher levels of confidence (e.g., 90% confidence indicates a high level of confidence whereas 10% confidence indicates a lower level of confidence). In this embodiment, a high threshold is established as having reached or exceed seventy-five percent. A low threshold is a threshold percentage between zero percent to and including twenty-five percent. A medium threshold is a threshold percentage twenty-six percent to seventy-four percent.

In certain other embodiments, positioning program 110 establishes at least 3 beacon points that can be used to predict a user location. For example, positioning program 110 can establish a Wi-Fi access point as a first beacon. In response to positioning program 110 determining a device associated with a first user reaches or exceeds a set level of confidence (e.g., positioning program 110 assigns a 90% confidence value to a position of a user device) that indicates a high probability of the first user device (and the first user) being in a given area (e.g., within an acceptable distance from a known beacon point), positioning program 110 can establish the first user device as another beacon point. In response to a second user requesting navigation to the first user, positioning program 110 can establish the second user's device (e.g., signals emitted from the second user's device) as the third beacon point (in response to positioning program 110 determining that the second user's device reaches or exceeds a confidence value indicating a high probability of the second user's location). Positioning program 110 can then use the three established beacon points to measure distances between the established beacon points to predict locations of users associated with the beacon points as discussed in greater detail with respect to FIGS. 2-5.

In this embodiment, positioning program 110 predicts a location of a user based on a detected distance from an established beacon point. In other embodiments, positioning program 110 can use a combination of probabilistic positioning and measured distances to established beacons.

In this embodiment, in response to determining a predicted location of a first user has reached or exceeded a configurable confidence threshold, positioning program 110 can then publish that predicted location to a second user (e.g., an approved contact the first user) and navigate the approved user to the predicted location of the first user. In this embodiment, positioning program 110 publishes the predicted location by publishing a tuple (e.g., Identification of the user device, estimated location, and accuracy) to a shared publish service. Positioning program 110 associates the identification of the user device with the medium the user device uses to act as a beacon (e.g., Bluetooth®, Wi-Fi, etc.). Positioning program 110 can then iteratively refine the predicted location and accuracy. In other embodiments, positioning program 110 may publish the predicted location anonymously referencing only the ID of the user device.

In response to determining that a predicted location of the first user has not reached or exceed a configurable confidence threshold, positioning program 110 refines its prediction iteratively until the configurable threshold has been reached or exceeded. In other embodiments, positioning program 110 can transmit a notification to the approved contact of the first user with information pertaining to the predicted location of the first user.

In certain embodiments, positioning program 110 can generate a real time map of predicted user locations based on distances from the established beacon points. For example, positioning program 110 can access database 112 that has blueprints associated with the structure a user is in. Positioning program 110 can then, in response to determining that the predicted location of a first user has reached or exceeded a configurable confidence threshold, publish the generated map to a second user (e.g., an approved contact of the first user).

In certain other embodiments, positioning program 110 can detect device signals of user devices and establish the detected devices as beacon points. For example, positioning program 110 can detect a device signal of a user when the user connects to a beacon point (e.g., Wi-Fi access point of a structure, cellular network, etc.). Positioning program 110 can then establish the detected device as a beacon point. Accordingly, positioning program 110 would then have at least two beacon points (e.g., the beacon point associated with the structure and the user's device serving as the second beacon point).

In this embodiment, positioning program 110 can update position information of moving entities based on distances of respective user devices to established beacon points. For example, positioning program 110 can establish a Wi-Fi access point as beacon point A and user alpha' device as beacon point B. Positioning program 110 can then navigate user beta (via user beta's device) to user alpha. Positioning program 110 can broadcast user beta's location (e.g., by updating position information of user beta) to user alpha in real time based on signal strength of user beta's device relative to the established beacon points.

In this embodiment, positioning program 110 obtains user permissions to share and upload location information for the navigation purposes. Positioning program 110 publishes established location beacons anonymously (i.e., with sensitive information removed) and can utilize location beacons to identify other potential location beacons. Positioning program 110 can then generate a map based on established location beacons which is then used to navigate a user from one point of interest to another within a structure (e.g., a building). In certain embodiments, positioning program 110 can transmit a notification to the user each time positioning program 110 collects information. Positioning program 110 provides an option to opt-in and opt-out of navigation services.

Figure 2:
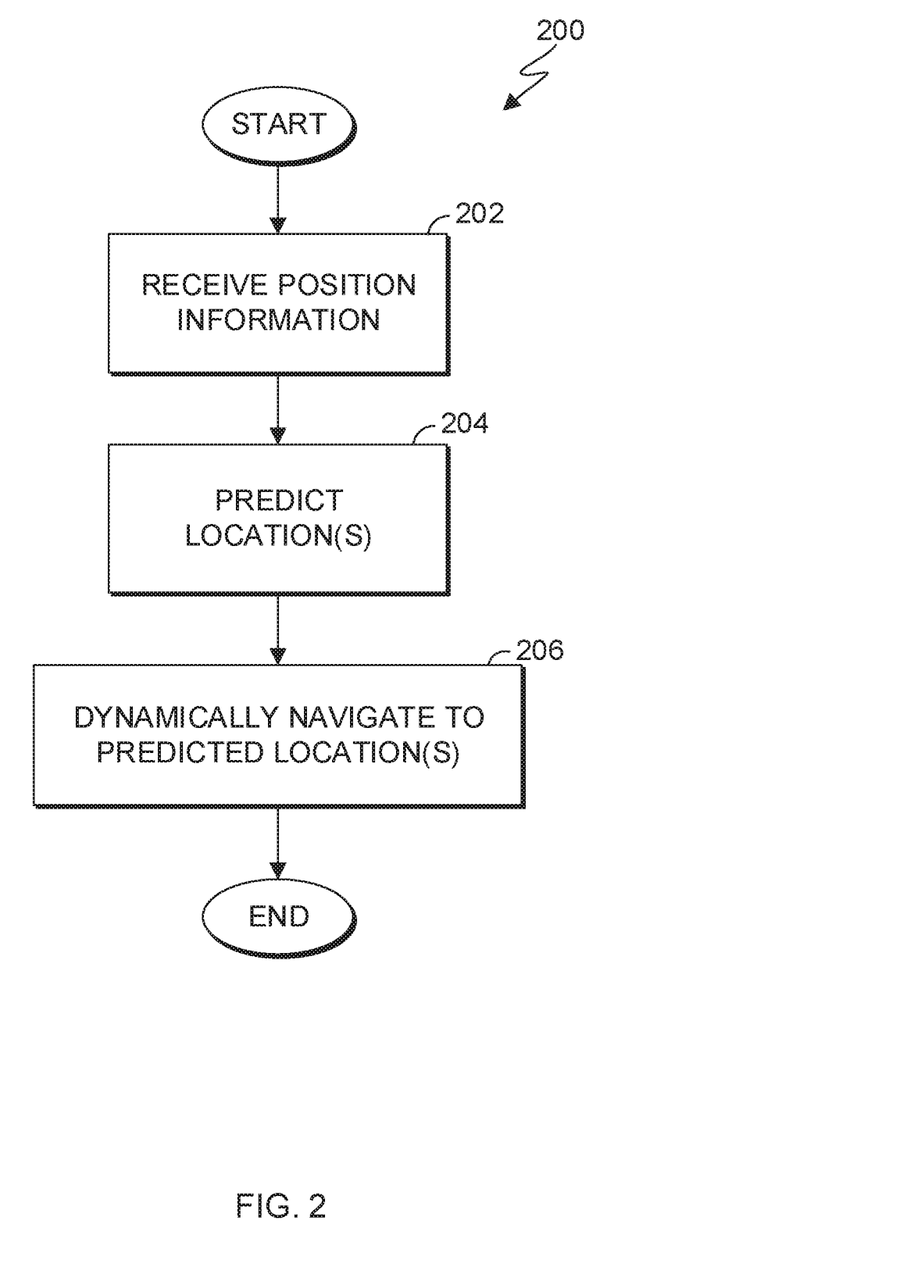
FIG. 2 is flowchart depicting operational steps for dynamically navigating moving entities, in accordance with an embodiment of the present invention.

FIG. 2 is flowchart 200 depicting operational steps for dynamically navigating moving entities, in accordance with an embodiment of the present invention.

In step 202, positioning program 110 receives user position information. In this embodiment, positioning program 110 receives position information from a user device. For example, positioning program 110 can receive an initial user position information by detecting magnetic fields associated with a user's device. As mentioned above, "positional information" refers to directional information or changes in directional information that includes a user or a target's location. Positional information can also include information surrounding an area of either the user or target (e.g., location information). For example, positional information can include location information such as building architecture, building plans, locations of one or more device sensors (e.g., Wi-Fi, access points, Bluetooth® receivers, or other detection capable devices), hours of operation of a building, road closures, anticipated traffic based on scheduled events such as concerts, real-time traffic, queue status of locations such as restaurant wait times, user shopping preferences, changes in location where the location is a moving location, speed and cardinal direction of a location (e.g., where the location destination is a user, the speed of the location can be of the user). Positioning program 110 can then receive one or more updates to the user position information. For example, positioning program 110 can receive a notification that the user device has connected to a known or otherwise established beacon point (e.g., Wi-Fi access point) within a structure.

In other embodiments, positioning program 110 receives position information from a combination of one or more user devices, one or more established beacon points, and one or more other components of computing environment 100. In yet other embodiments, positioning program 110 can receive a user query to navigate a user within a structure according to user preferences. In other embodiments, application 104 can transmit user preferences and/or user search queries.

In step 204, positioning program 110 predicts a location of a user. In this embodiment, positioning program 110 predicts a location of a user by retrieving location details of a structure, establishing one or more location beacons, and updating position information associated with the user based on the established location beacons as discussed in greater detail with regard to FIG. 3. For example, positioning program 110 can receive a user request to navigate to another user within a building. Positioning program 110 can then retrieve location information of the building, identify known location beacons from the location details and identify floor plans of the building. Positioning program 110 can then detect a location associated with the user requesting navigation services based on the magnetic field emitted by the user device. Positioning program 110 can then refine its location prediction in response to the user device connecting to one or more sensors (e.g., Wi-Fi, Bluetooth®, etc.) that have been established as beacon points. Positioning program 110 can then establish the user device as a beacon point and utilize a combination of the known beacon points (e.g., the user device and the connected sensor) to locate (and possibly connect to) the other user and the other user's device.

In step 206, positioning program 110 dynamically navigates to a predicted location. In this embodiment, positioning program 110 dynamically navigates to the predicted location based on proximity to established beacon locations as discussed in greater detail with regard to FIG. 4. Continuing the above example, positioning program 110 can navigate to the other user based on collected location information. For example, positioning program 110 collects multiple position information for connected devices and established location beacons. Positioning program 110 can then generate a map that visually displays the collected location information. In response to a change in position (e.g., a directional change) of a user, positioning program 110 then refines position information based on signal strength and proximity to the location beacons. For example, as the user's device moves closer to an established location beacon, positioning program 110 increases its confidence value calculation and updates the map and directions accordingly. In certain other embodiments, positioning program 110 can use object recognition, facial recognition, and gait analysis of the user to confirm its confidence prediction.

Figure 3:
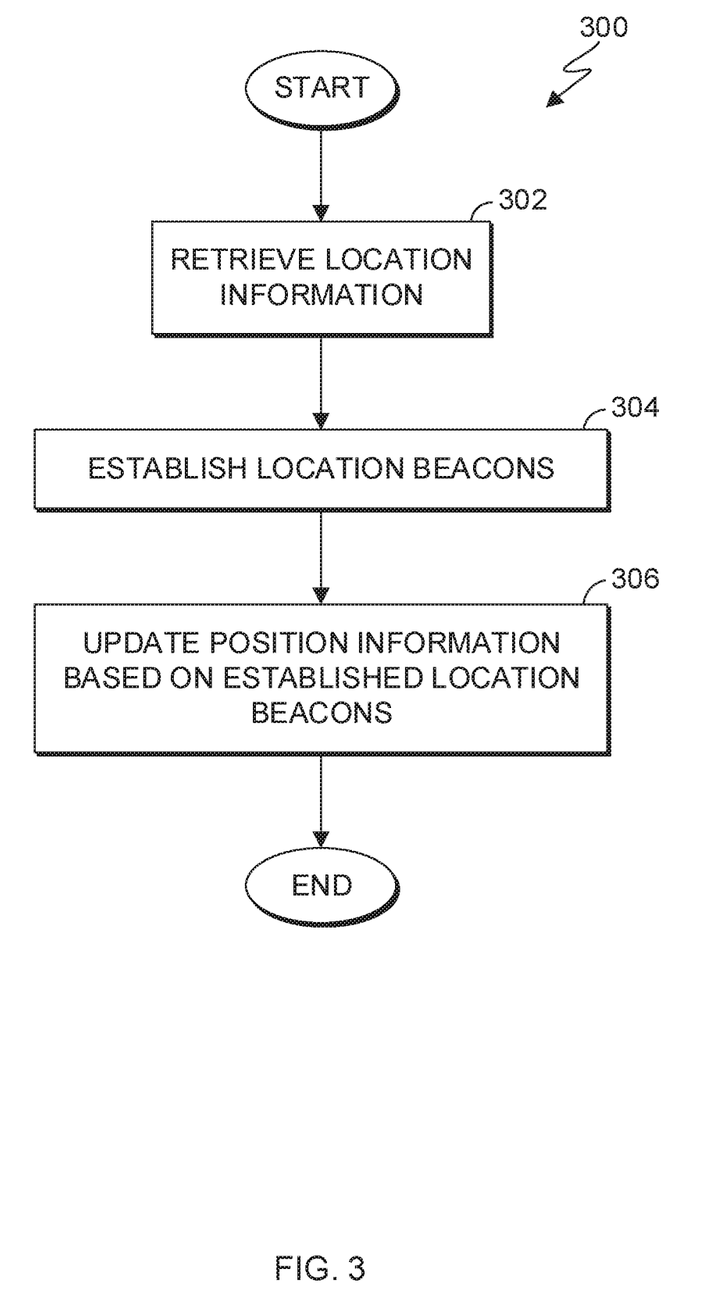
FIG. 3 is a flowchart depicting operational steps for predicting locations of moving entities, in accordance with an embodiment of the present invention.

FIG. 3 is a flowchart 300 operational steps for predicting locations of moving entities, in accordance with an embodiment of the present invention.

In step 302, positioning program 110 retrieves location information. As discussed previously, positioning program 110 retrieves location information such as building architecture, building plans, locations of one or more device sensors (e.g., Wi-Fi, access points, Bluetooth® receivers, or other detection capable devices), hours of operation of a building, road closures, anticipated traffic based on scheduled events such as concerts, real-time traffic, queue status of locations such as restaurant wait times, user shopping preferences, changes in location where the location is a moving location, speed and cardinal direction of a location (e.g., where the location destination is a user, the speed of the location can be of the user). In this embodiment, positioning program 110 retrieves location information from a database (e.g., database 112). In other embodiments, positioning program 110 retrieves location information for either a public database or may request access to a private database for location information (e.g., building plans, beacon points, and architecture).

In instances where location information in unavailable or otherwise inaccessible to positioning program 110, positioning program 110 can utilize a detection module to broadcast a signal to existing beacons of a structure and generate a map of the structure (i.e., location) based on detected beacons. For example, a user can enter a structure and the structure's architecture and building plans and layouts are inaccessible to positioning program 110. Positioning program 110 can then utilize a detection module to detect that there are at least three beacon points on a floor and positioned equidistant from each other.

In step 304, positioning program 110 establishes location beacons. In this embodiment, positioning program 110 establishes location beacons utilizing a detection module to broadcast a signal to existing beacons of a structure. In instances where location details of existing beacons are known, positioning program utilizes a detection module to confirm the presence and/or absence of existing location beacons. In instances where location information is unknown, positioning program 110 can utilize the detection module to identify existing location beacons and generate a map of the structure (i.e., location) based on detected beacons. In certain other embodiments, positioning program 110 can periodically broadcast a detection signal to identify and establish an update to date database of location beacons for a given structure (e.g., building).

In this embodiment, positioning program 110 can establish one or more user devices as location beacons and subsequently update a database of location beacons for a given structure. For example, positioning program 110 can identify that a structure (e.g., a first floor of a building) has two location beacons (e.g., location beacon A and location beacon B) and that there is a user device in the area (e.g., in the first floor). In response to positioning program 110 detecting that the user device connects to location beacon A, positioning program 110 can identify that the user device is within a certain radius of location beacon A. Positioning program 110 can then assign a high confidence value (with respect to position of the user device) to the user device. In response to positioning program 110 determining that the confidence value assigned to the user device reaching or exceeding the threshold for position information, positioning program 110 can then establish (with permission from the user) the user device as a location beacon.

In this manner, positioning program 110 can identify one or more user devices either by magnetic fields emitted by each of the one or more user devices or by a connection to or proximity to a location beacon. Accordingly, positioning program 110 can then, in response to a user giving permission, establish the user device as a location beacon for other devices for the duration in which the user device is present in the location.

In step 306, positioning program 110 updates position information based on established location beacons. In step 306, positioning program 110 updates position information based on established location beacons by monitoring changes in location. For example, positioning program 110 can, at regular intervals, ping the user device to identify distances from existing location beacons. Positioning program 110 can then generate a map of position information for the user device (now acting as a location beacon) and update movements of the user device in relation to position and proximity to other existing location beacons based on signal strength, as discussed in greater detail with regard to FIG. 4.

Figure 4:
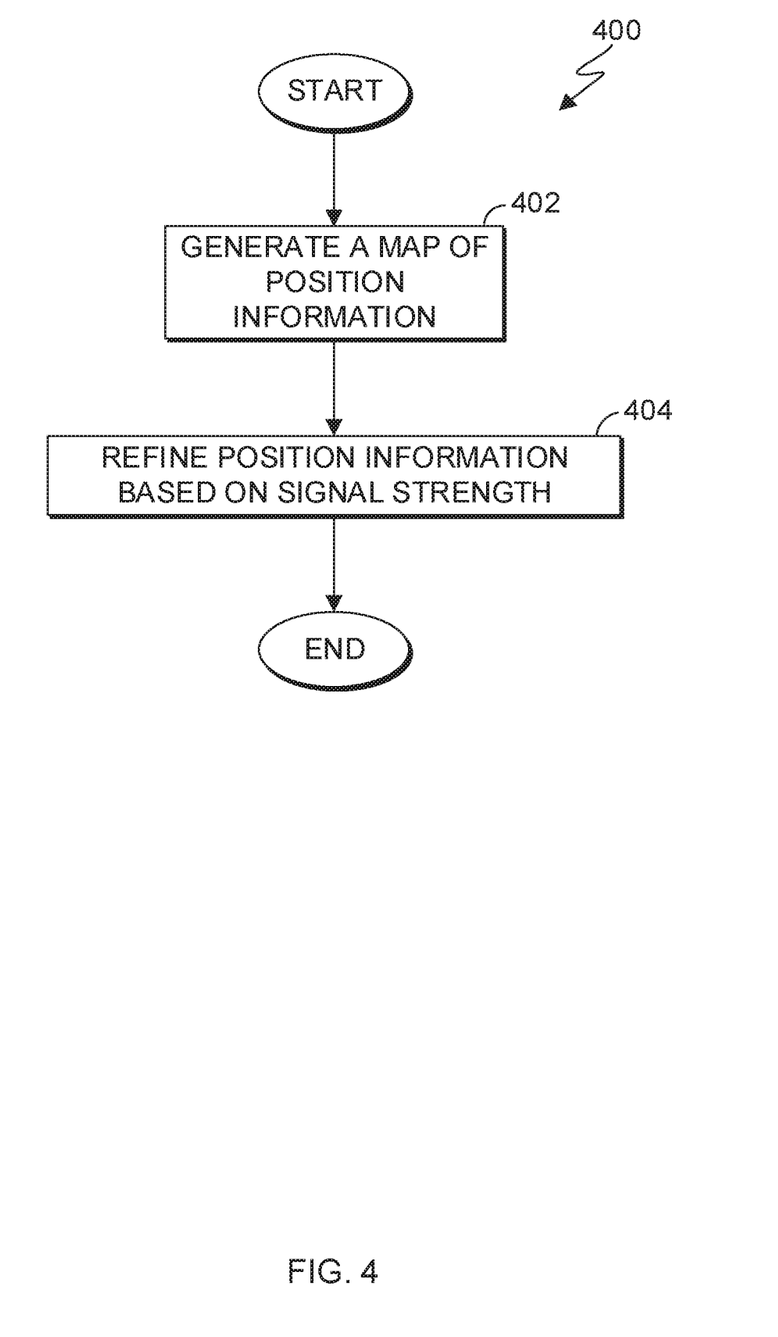
FIG. 4 is a flowchart depicting operational steps for updating position information, in accordance with an embodiment of the present invention.

FIG. 4 is a flowchart 400 depicting operational steps for updating position information, in accordance with an embodiment of the present invention.

In step 402, positioning program 110 generates a map of position information. In this embodiment, positioning program 110 generates a map of position information for each established location beacon. For example, positioning program 110 can utilize a detection module to detect that there are three location beacons on a floor of a structure. Positioning program 110 can further utilize the detection module to identify the magnetic field emitted by a user device and subsequently establish the user device (according to user permissions) as a location beacon. Positioning program 110 can then run a merger module to combine the collected information to form a map of the floor and the relationship and distances to each established location beacon. Continuing the example, positioning program 110 can identify that the three location beacons, A, B, and C are located equidistant from each other with location beacon A and C at opposite ends of a hallway and location beacon B is located equidistant from and in between location beacons A and C. Positioning program 110 can then identify that a user device is in a location approximately south of location beacon A but is not in range, has not connected to, and is not in immediate proximity to location beacon A. Positioning program 110 can then utilize a merger module to compile the collected information and build a map showing the locations of each of the established location beacons.

In step 404, positioning program 110 refines position information based on signal strength. In this embodiment, positioning program refines position information of established location beacons by periodically utilizing a detection module to detect changes in position of each of the established location beacons. For fixed location beacons such as Wi-Fi access points, Bluetooth® connection devices, etc., positioning program 110 can run the detection module less frequently to confirm those respective beacon locations. For moving location beacons (e.g., user devices), positioning program 110 can be configured to run detection modules at regular intervals to identify positions of each user device.

In certain other embodiments, positioning program 110 can further assign confidence values associated with each of the detected positions of moving location beacons. Positioning program 110 can run the detection module to identify distance of a moving location beacon to a fixed location beacon. The closer to physical proximity to an established, fixed location beacon, the higher the confidence value assigned to the moving location beacon. Positioning program 110 can then utilize the moving location beacon to identify other positions of other user devices or other moving sensors.

In yet other embodiments, positioning program 110 can run probabilistic prediction algorithms to predict future locations of the moving location beacons. For example, positioning program 110 can identify from a user calendar that the user has a scheduled meeting at 10:00 am in meeting hall X. Positioning program 110 can then confirm its prediction when the user device is in proximity to or connects with an existing location beacon in meeting hall X.

Figure 5:
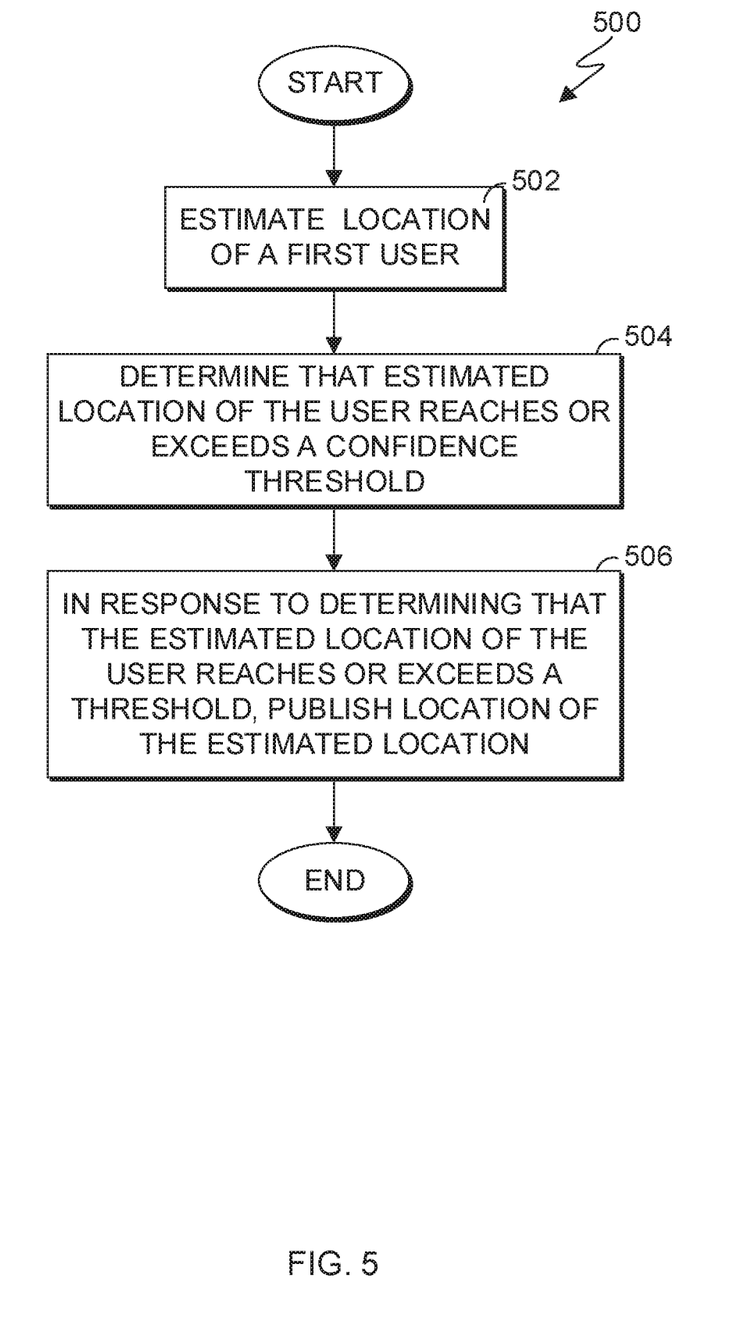
FIG. 5 is a flowchart depicting alternate steps for dynamically navigating moving entities to enable collaborative positioning, in accordance with an embodiment of the present invention.

FIG. 5 is a flowchart, designated flowchart 500 depicting alternate steps for dynamically navigating moving entities to enable collaborative positioning, according to an embodiment of the present invention.

In step 502, positioning program 110 estimates a location of a user. In this embodiment, positioning program 110 estimates a location of a user within a structure by detecting magnetic fields of a device of the user. Positioning program 110 can then refine the estimated location of a user in response to the user device connecting to an established beacon point (e.g., Wi-Fi access point of a structure) using a detection module. Positioning program 110 can then ping the user device at regularly scheduled intervals to refine a user's estimated location using a merge module to process user device information, identify signal strength connection to the established beacon point and incorporate location information associated with the established beacon point.

In other embodiments, positioning program 110 can then establish the connected user device as a beacon point (with user permission) and leverage connections to the user device, proximity to the user device as a means to identify other beacon points and/or other user devices. Accordingly, by establishing multiple beacon points, positioning program 110 can generate a map of a structure (e.g., location information).

In step 504, positioning program 110 determines that the estimated location of the user reaches or exceeds a confidence threshold. In this embodiment, positioning program 110 determines that the estimated location of the first user reaches or exceeds a confidence threshold using a combination of probabilistic determination and strength of signal connection to a beacon point. For example, a user device not connected to a beacon point may be detected only by magnetic field emitted by the user device. Accordingly, positioning program 110 would assign a low confidence position information to the detected user device. Conversely, in response to the user device connecting to an established beacon point, positioning program 110 then assigns either a medium to high confidence value based on signal strength connection (e.g., the closer in physical proximity to the established beacon point is directly proportional to the confidence level assigned to the device).

In step 506, positioning program 110 publishes the estimated location in response to determining that the estimated location of the user reaches or exceeds a threshold. In this embodiment, in response to determining an estimated location of a first user has reached or exceeded a configurable confidence threshold, positioning program 110 publishes (anonymously) the estimated location to a database (e.g., database 112). In this embodiment, positioning program 110 publishes the estimated location by publishing a tuple (e.g., identification of the user device, estimated location, and accuracy) to a shared publish service. Positioning program 110 associates the identification of the user device with the medium the user device uses to act as a beacon (e.g., Bluetooth®, Wi-Fi, etc.). Positioning program 110 can then iteratively refine the predicted location and accuracy. In other embodiments, positioning program 110 may publish the predicted location anonymously referencing only the ID of the user device. In other embodiments, positioning program 110 can publish the predicted location to a second user (e.g., an approved contact the first user) and navigate the approved user to the predicted location of the first user.

Figure 6:
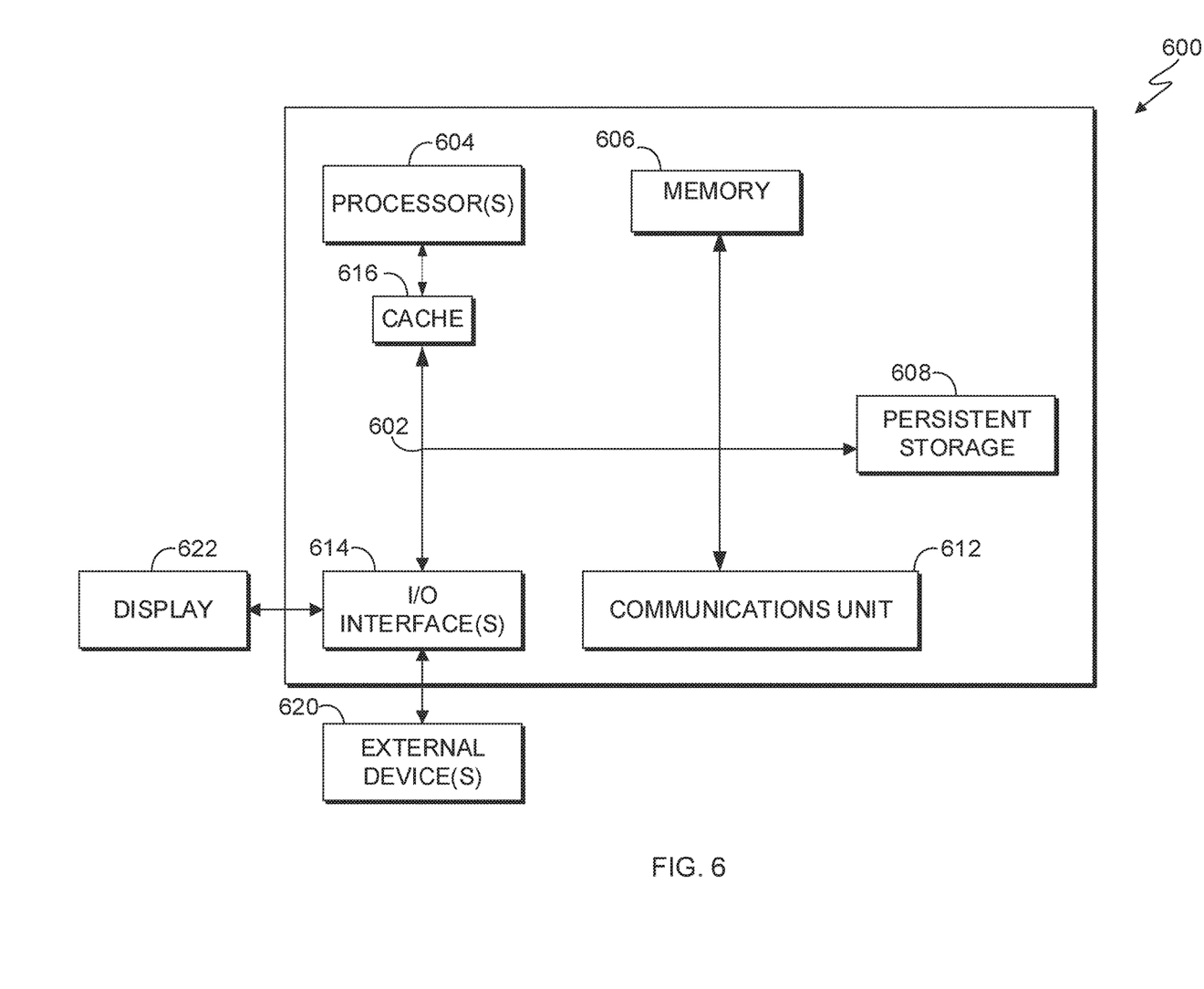
FIG. 6 depicts a block diagram of components of the computing systems of FIG. 1, in accordance with an embodiment of the present invention.

FIG. 6 depicts a block diagram of components of computing systems within computing environment 100 of FIG. 1, in accordance with an embodiment of the present invention. It should be appreciated that FIG. 6 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 600 includes communications fabric 602, which provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Positioning program 110 (not shown) may be stored in persistent storage 608 and in memory 606 for execution by one or more of the respective computer processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Positioning program 110 may be downloaded to persistent storage 608 through communications unit 610.

I/O interface(s) 612 allows for input and output of data with other devices that may be connected to client computing device 102 and server computer 108. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein

What is claimed is:

1. A computer-implemented method comprising:
   receiving position information for one or more user devices and location information for an area;
   predicting one or more locations of the one or more user devices by:
      estimating a possible location of a first user device of the one or more user devices based on magnetic fields emitted by the first user device and proximity to established location beacons, and
      in response to the first user device connecting to an established location beacon, modifying a confidence value associated with the possible location; and
   in response to a request for navigation services, dynamically navigating the first user device of the one or more devices to a second user device of the one or more devices within the area.

2. The computer-implemented method of claim 1, wherein predicting one or more locations of the one or more user devices comprises:
   transmitting a detection signal to identify location beacons of the area;
   confirming the identified location beacons as an established location beacon; and
   storing the confirmed identification location beacons in a database.

3. The computer-implemented method of claim 2, further comprising:
   assigning the possible location of the first user device a confidence value.

4. The computer-implemented method of claim 3, further comprising:
   in response to the first user device connecting to an established location beacon of the established location beacons, assigning the first user device a greater confidence value.

5. The computer-implemented method of claim 4, further comprising:
   in response to the first user device reaching or exceeding a confidence value threshold, establishing the first user device as a moving location beacon; and
   storing the moving location beacon as an established location beacon in the database.

6. The computer-implemented method of claim 5, further comprising:
   publishing position information of the first user device reaching or exceeding the confidence value threshold to a location service, wherein the position information includes a device identifier that specifies connection method to an established beacon location, an estimated location for the first user device, and accuracy of estimation.

7. The computer-implemented method of claim 6, further comprising:
   dynamically refining the position information of the first user device at regular time intervals based on signal strength connection to an established location beacon of the established location beacons.

8. A computer program product comprising:
   one or more computer readable storage media and program instructions stored on the one or more computer readable storage media, the program instructions comprising:
      program instructions to receive position information for one or more user devices and location information for an area;
      program instructions to predict one or more locations of the one or more user devices by:
         program instructions to estimate a possible location of a first user device of the one or more user devices based on magnetic fields emitted by the first user device and proximity to established location beacons, and
         program instructions to, in response to the first user device connecting to an established location beacon, modify a confidence value associated with the possible location; and
      program instructions to, in response to a request for navigation services, dynamically navigate a first user device of the one or more devices to a second user device of the one or more devices within the area.

9. The computer program product of claim 8, wherein the program instructions to predict one or more locations of the one or more user devices comprise:
   program instructions to transmit a detection signal to identify location beacons of the area;
   program instructions to confirm the identified location beacons as an established location beacon; and
   program instructions to store the confirmed identification location beacons in a database.

10. The computer program product of claim 9, wherein the program instructions stored on the one or more computer readable storage media further comprise:
    program instructions to assign the possible location of the first user device a confidence value.

11. The computer program product of claim 10, wherein the program instructions stored on the one or more computer readable storage media further comprise:
    program instructions to, in response to the first user device connecting to an established location beacon of the established location beacons, assign the first user device a greater confidence value.

12. The computer program product of claim 11, wherein the program instructions stored on the one or more computer readable storage media further comprise:
    program instructions to, in response to the first user device reaching or exceeding a confidence value threshold, establish the first user device as a moving location beacon; and
    program instructions to store the moving location beacon as an established location beacon in the database.

13. The computer program product of claim 12, wherein the program instructions stored on the one or more computer readable storage media further comprise:
    program instructions to publish position information of the first user device reaching or exceeding the confidence value threshold to a location service, wherein the position information includes a device identifier that specifies connection method to an established beacon location, an estimated location for the first user device, and accuracy of estimation.

14. The computer program product of claim 13, wherein the program instructions stored on the one or more computer readable storage media further comprise:
    program instructions to dynamically refine the position information of the first user device at regular time intervals based on signal strength connection to an established location beacon of the established location beacons.

15. A computer system comprising:
    one or more computer processors;
    one or more computer readable storage media; and
    program instructions stored on the one or more computer readable storage media for execution by at least one of the one or more computer processors, the program instructions comprising:
       program instructions to receive position information for one or more user devices and location information for an area;
       program instructions to predict one or more locations of the one or more user devices by:
          program instructions to estimate a possible location of a first user device of the one or more user devices based on magnetic fields emitted by the first user device and proximity to established location beacons, and
          program instructions to, in response to the first user device connecting to an established location beacon, modify a confidence value associated with the possible location; and
       program instructions to, in response to a request for navigation services, dynamically navigate a first user device of the one or more devices to a second user device of the one or more devices within the area.

16. The computer system of claim 15, wherein the program instructions to predict one or more locations of the one or more user devices comprise:
    program instructions to transmit a detection signal to identify location beacons of the area;
    program instructions to confirm the identified location beacons as an established location beacon; and
    program instructions to store the confirmed identification location beacons in a database.

17. The computer system of claim 16, wherein the program instructions stored on the one or more computer readable storage media further comprise:
    program instructions to assign the possible location of the first user device a confidence value.

18. The computer system of claim 17, wherein the program instructions stored on the one or more computer readable storage media further comprise:
    program instructions to, in response to the first user device connecting to an established location beacon of the established location beacons, assign the first user device a greater confidence value.

19. The computer system of claim 18, wherein the program instructions stored on the one or more computer readable storage media further comprise:
    program instructions to, in response to the first user device reaching or exceeding a confidence value threshold, establish the first user device as a moving location beacon; and
    program instructions to store the moving location beacon as an established location beacon in the database.

20. The computer system of claim 19, wherein the program instructions stored on the one or more computer readable storage media further comprise:
    program instructions to publish position information of the first user device reaching or exceeding the confidence value threshold to a location service, wherein the position information includes a device identifier that specifies connection method to an established beacon location, an estimated location for the first user device, and accuracy of estimation.

* * * * *